March 8, 1932. P. D. Z. RILEY 1,848,199
FAN MOTOR
Filed March 25, 1930
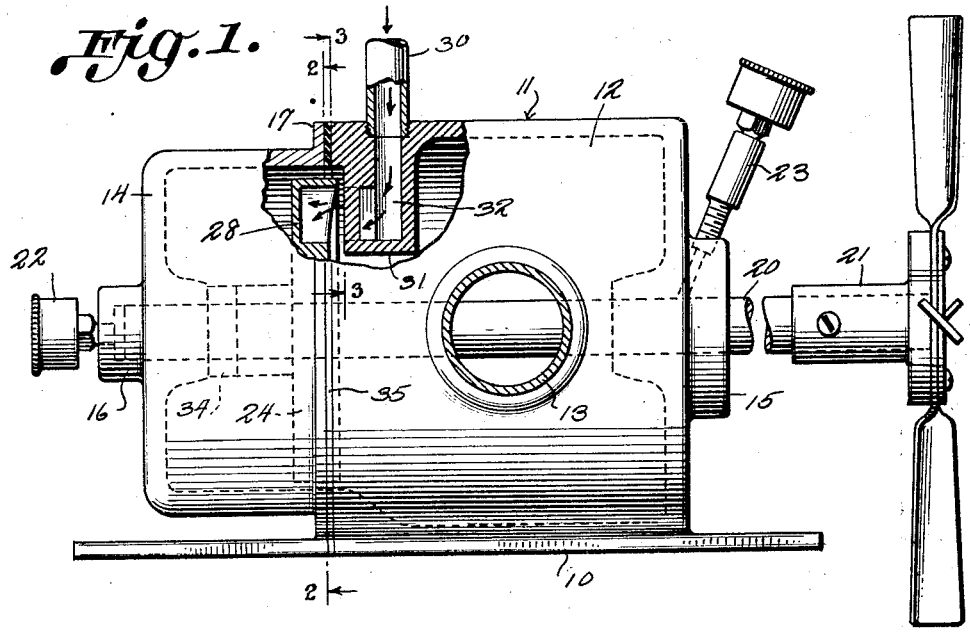
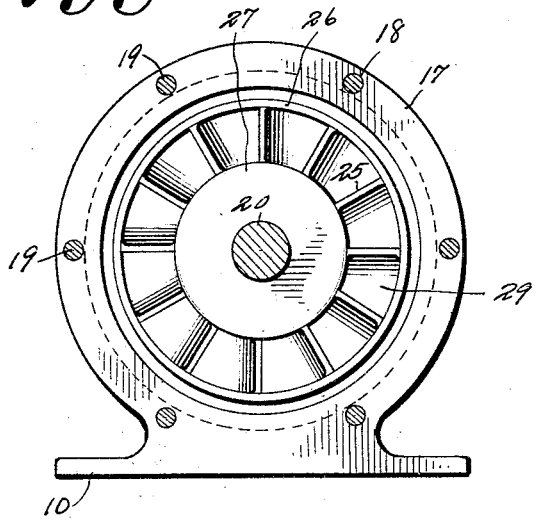
Inventor:
P. D. Z. Riley
Watson E. Coleman
Attorney Patented Mar. 8, 1932

1,848,199

UNITED STATES PATENT OFFICE

PETE DEWEY Z. RILEY, OF SUPERIOR, NEBRASKA

FAN MOTOR

Application filed March 25, 1930. Serial No. 438,808.

The present invention relates to fans and more particularly to a fan which is adapted to be driven by a motor receiving its power from air, steam or water.

An object of this invention is to provide a motor for a fan which is so constructed as to permit the use of either air, steam or water.

Another object of this invention is to provide a small compact motor of simple construction which is operated on the turbine principle, the rotor of the motor having a plurality of fins or blades against which the steam, water or air is adapted to strike for rotation thereof.

The above and various other objects and advantages of this invention will in part be described in and in part be understood from the following detailed description of the present preferred embodiment, the same being illustrated in the accompanying drawings wherein:—

Figure 1 is a detail side elevation partly in section of a device constructed according to the preferred embodiment of this invention;

Figure 2 is a view taken on the line 2—2 of Figure 3; and

Figure 3 is a view taken on the line 3—3 of Figure 1.

Referring to the drawings wherein like numerals of reference designate corresponding parts throughout the several views, the numeral 10 designates a base upon which is adapted to be mounted a casing 11, the casing 11 being preferably of substantially annular or cylindrical form, the inner portion of the casing comprising an expansion chamber 12 which is provided with an outlet opening 13 which may be connected by means of a pipe or the like to a suitable steam, air or water discharge conduit.

The casing 11 is provided at one end thereof with a restricted end portion 14 and the opposite ends of the casing 11 are provided with enlarged bearings 15 and 16. The reduced end portion 14 is preferably constructed in the form of a cap or the like which is provided with an outwardly extending flange 17 which may be provided with suitable apertures 18 therethrough for receiving bolts 19 or the like so as to secure the cap 14 upon the casing.

A rotatable shaft 20 is rotatably mounted in the bearings 15 and 16 and extends outwardly through the bearing 15 so as to receive a fan 21 or the like which is secured thereto and adapted for rotation therewith. The opposite end of the shaft 20 terminates within the bearing 16, the outer face of the bearing 16 being closed so as to prevent longitudinal movement of the shaft 20. A grease cup or lubricating element 22 may be secured to the bearing 16 so as to properly lubricate the bearing, and a similar lubricating element 23 may be threadably positioned in the bearing 15.

A rotary member or wheel 24 is secured to the shaft 20 and is adapted to be positioned within the cap portion 14. The rotary wheel 24 is preferably of substantially turbine construction having a plurality of fins 25 which are radially inclined, and the periphery of the rotor 24 is preferably provided with a cylindrical flange 26 to which the outer ends of the fins or blades are secured. The inner ends of the blades 25 may be secured to an annular member 27 which is formed integrally with the rotor 24, and one edge of the blades 25 is preferably secured to an annular plate 28 so as to form a pocket 29 between each of the blades or fins 25.

An intake conduit or port 30 is threadably secured to the casing 11 and the casing 11 is also provided with a depending chest 31 which is provided with a vertically disposed aperture 32 in communication with the intake conduit 30, and the chest 31 is also provided with a laterally disposed and inwardly inclined outlet port 33 which is adapted to project the air, steam or water against the fins 25.

A thrust bearing 34 or the like may be interposed between the rotor 24 and the inner edge portion of the bearing 16. A gasket or annular washer member 35 may be interposed between the cap 14 and the casing 11.

In the operation of this device, the power energy in the form of air, steam or water is adapted to enter the chest 31 through the intake port 30 and passing downwardly through the intake port 30, and the vertically disposed aperture 32 will be diverted laterally through the outlet 33 in the chest, the fluid or air passing outwardly from the port 33 striking against the blades 25 and causing the rotation thereof. The fluid, air or steam will subsequently pass into the chamber 12 and outwardly of the chamber through the outlet port 13. The rotation of the rotor 24 will coactively rotate the shaft 20 and the fan 21.

From the foregoing it will be obvious that a relatively simple motor structure has been provided for a fan, the motor being constructed on the turbine principle, and is so constructed as to permit the use of any form of power which is available.

It is, of course, understood that various changes and modifications may be made in the details of construction and design of the above specifically described embodiment of the invention without departing from the spirit thereof, such changes and modifications being restricted only by the scope of the following claim.

What is claimed is:—

A water motor comprising a casing, a shaft rotatably mounted in the casing, a rotor secured to said shaft within said casing, radially inclined fins carried by said rotor and having a free edge portion disposed on one side of said rotor, an annular member carried by said rotor and secured to one edge of each fin whereby to coact with said fins in providing power pockets opening on one face of said rotor, a power intake member mounted in the casing and discharging into the open side of said power pockets, said casing also having an outlet port disposed on the open side of said pockets whereby to permit the discharge of the water from the casing without retarding the rotation of the rotor.

In testimony whereof I hereunto affix my signature.

PETE DEWEY Z. RILEY.